March 27, 1951      E. L. LAUNDER      2,546,458
WORK HOLDER FOR USE IN WELDING
Filed Nov. 14, 1947      2 Sheets-Sheet 1
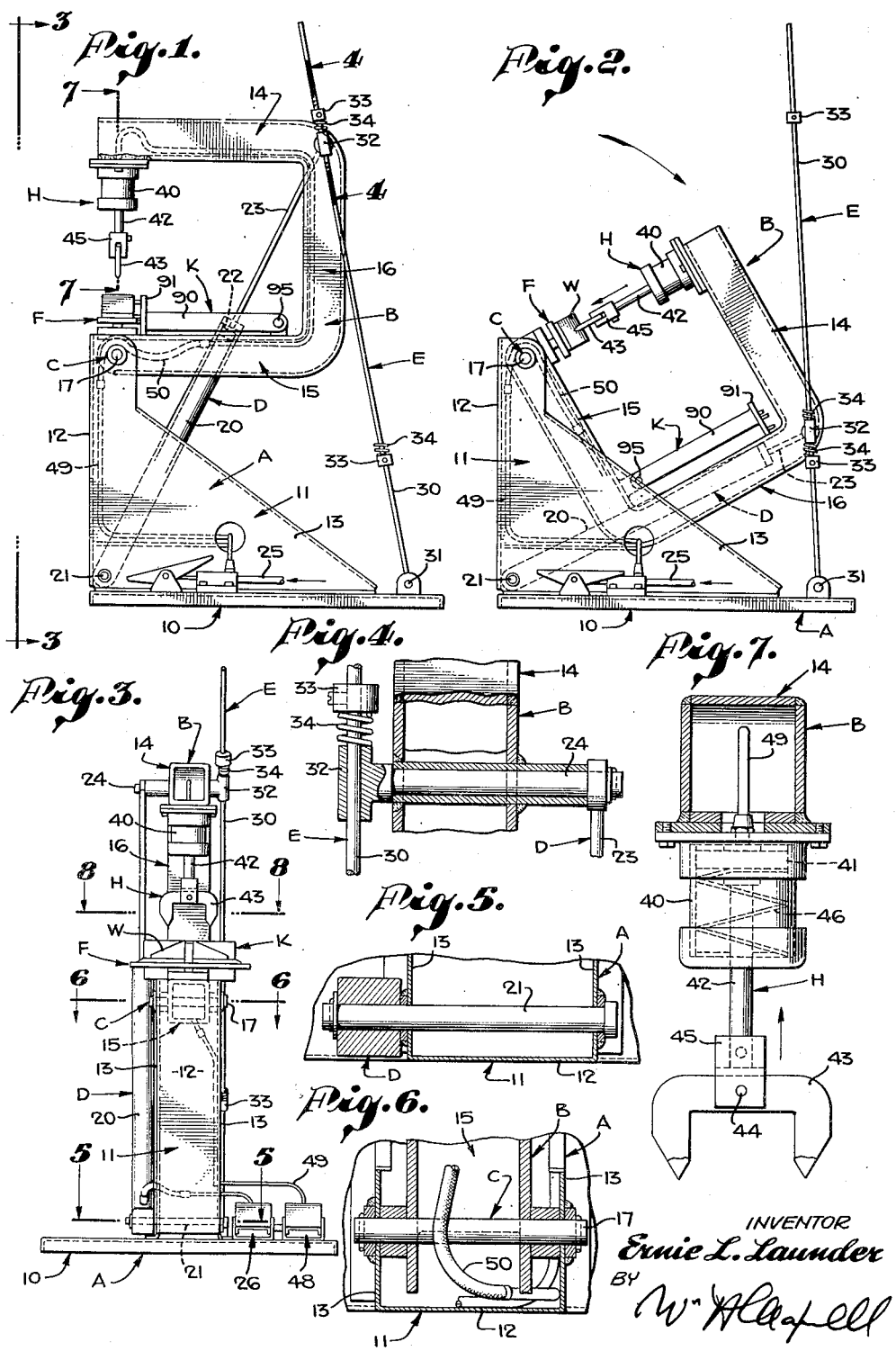
INVENTOR
Ernie L. Launder
BY
ATTORNEY March 27, 1951  E. L. LAUNDER  2,546,458
WORK HOLDER FOR USE IN WELDING
Filed Nov. 14, 1947  2 Sheets-Sheet 2
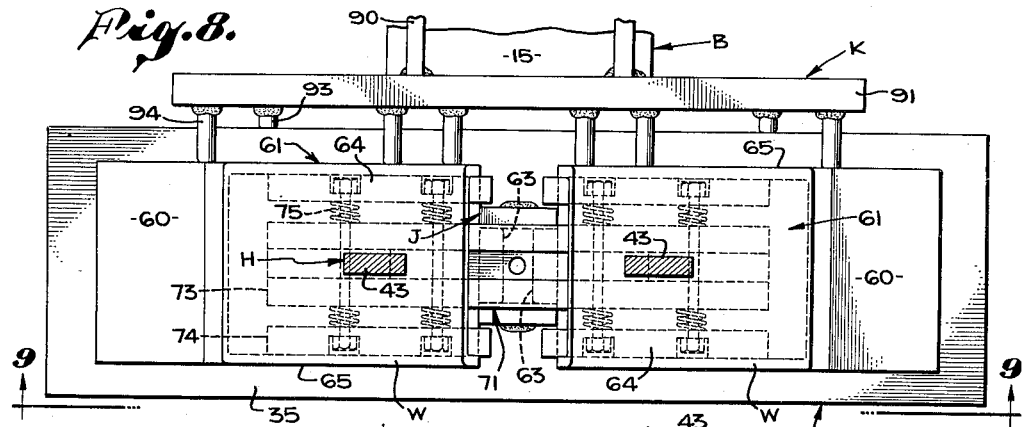
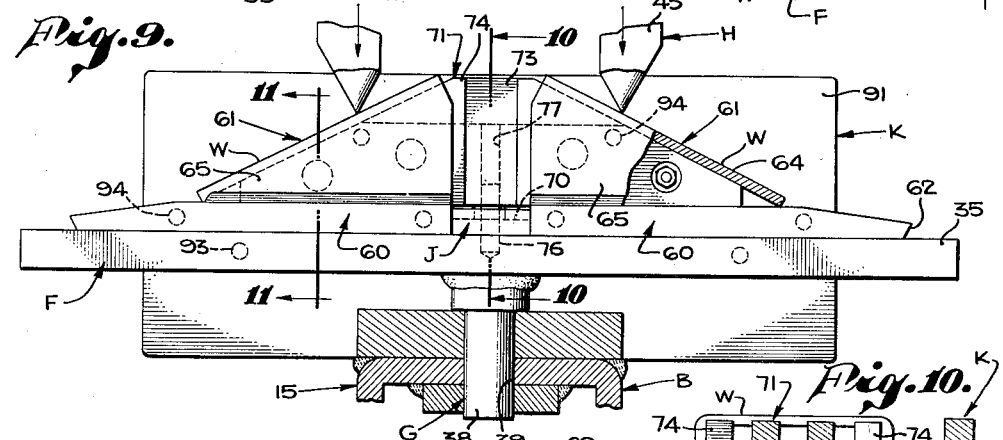
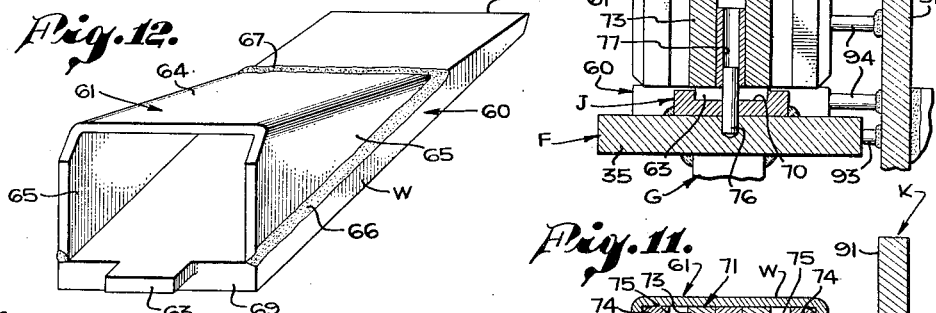
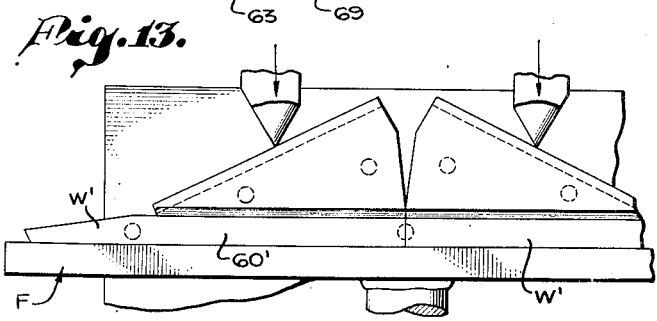
INVENTOR
Ernie L. Launder
BY
ATTORNEY Patented Mar. 27, 1951

2,546,458

UNITED STATES PATENT OFFICE 2,546,458

WORK HOLDER FOR USE IN WELDING

Ernie L. Launder, Montebello, Calif., assignor to H. and L. Tooth Company, Los Angeles, Calif., a corporation of California Application November 14, 1947, Serial No. 785,884

2 Claims. (Cl. 29—288)

This invention relates to a work holder for use in welding and it is a general object of the present invention to provide a simple, practical, easily operated device by which an object or work piece of varying form may be supported in a most advantageous manner in the course of welding the various parts thereof.

In the course of manufacturing articles or objects requiring welding and where the welds run at different angles at different parts of such objects, difficulties are experienced due to the fact that in the course of welding the molten material runs or flows in an undesirable manner, unless the point of weld is substantially horizontal. It is of course possible for the operator or welder to shift an object from one position to another in the course of making the several welds or in the course of welding at several different parts, but this is slow, inconvenient and oftentimes cumbersome.

The present invention is, in accordance with its broader principles, useful for handling various objects or devices requiring welding. However, as it is particularly useful and practical for handling objects such as digger teeth or caps for digger teeth, we will describe it specifically with reference to such objects. However, I wish it understood that modifications and variations may be made as circumstances require, in order to adapt it to other devices or objects.

In the case of a digger tooth or digger tooth cap such as I refer to the object or unit of work is made up of two parts, one a flat elongate blade and the other a mounting shell or cap engaged with the blade and welded thereto lengthwise of the blade and also transversely of the blade, thus presenting welds at different parts or extending in different directions inconvenient or inaccessible without shifting the object relative to the welder, and requiring that the points of weld be substantially horizontally disposed during the course of welding in order to prevent molten material from running in an undesirable manner.

It is a general object of the present invention to provide a work holder for objects such as I have referred to which involve few simple, easily operated parts, enabling the welder while seated or located in a convenient position to manipulate the work from one position to another, bringing the parts to be welded successively into position convenient to the welder and substantially horizontal, to be disposed in a most advantageous position for welding.

It is another object of the present invention to provide apparatus or a work holder of the general character referred to including power means for shifting the elements that are heavy or unwieldy, thus enabling the welder to operate the apparatus quickly and with a minimum of effort.

Another object of the present invention is to provide a holder of the general character referred to with power means for retaining the work in position in the holder so that the parts to be welded, though initially loose, are positively and firmly held in position throughout the course of welding.

It is another object of the present invention to provide a holder of the general character referred to which is simple and inexpensive of manufacture and which involves few easily operated parts.

The various objects and features of my invention will be fully understood from the following detailed description of typical preferred forms and applications of the invention, throughout which description reference is made to the accompanying drawings, in which:

Fig. 1 is a side elevation of a machine or holder embodying the present invention, showing work located therein and ready to be engaged by the retainer. Fig. 2 is a view similar to Fig. 1 showing the machine operated from the position shown in Fig. 1 with the work retainer engaged, holding the work in position in the holder. Fig. 3 is an end elevation of the machine taken as indicated by line 3—3 on Fig. 1. Fig. 4 is an enlarged detailed sectional view taken as indicated by line 4—4 on Fig. 1. Fig. 5 is an enlarged detail sectional view taken as indicated by line 5—5 on Fig. 3. Fig. 6 is an enlarged sectional view taken as indicated by line 6—6 on Fig. 3. Fig. 7 is an enlarged detailed sectional view taken as indicated by line 7—7 on Fig. 3. Fig. 8 is an enlarged plan view of the work rest showing units of work thereon with the retainer engaging the work and showing the means provided for positioning the work engaged therewith, being an enlarged view taken as indicated by line 8—8 on Fig. 3. Fig. 9 is a side elevation of the part shown in Fig. 8, being a view taken as indicated by line 9—9 on Fig. 8 with certain of the parts broken away to show in section. Fig. 10 is a sectional view taken as indicated by line 10—10 on Fig. 9. Fig. 11 is a sectional view taken as indicated by line 11—11 on Fig. 9. Fig. 12 is a perspective view illustrating a unit of work such as may be handled to advantage in the holder of the present invention, and Fig. 13 is a view similar to Fig. 9 showing another form of construction wherein two units of work are in direct abutting engagement on the work rest.

Referring first to the form of the invention illustrated in Figs. 1 to 12, inclusive, the machine of the present invention involves, generally, a base A, a frame B, means C mounting the frame on the base, actuating means D for the frame, stop means E for the frame, a work rest F, mounting means G for the rest, work retaining means H cooperatively related to the rest, a spacer J on the rest spacing units of work apart on the rest, and means K positioning work parts on the rest during assembly preliminary to actuation of the means H.

The base A may, in practice, vary widely in form and construction depending upon the size of the machine and the class of work to be handled thereby. The particular base illustrated in the drawings involves a bottom or platform 10 that may be in the nature of a flat plate to rest on a floor or other suitable support. The base further includes an upright or standard 11 rigid on the platform 10 and projecting upwardly therefrom, preferably at the forward portion thereof. The particular standard shown in the drawings involves a front 12 and spaced parallel sides 13 extending rearwardly from the vertical edges of the front. The lower edges of the front 12 and sides 13 are bonded or joined to the plate 10 as by welding or the like.

The frame B supported on or from the base A through the means C involves, primarily, upper and lower arms 14 and 15, respectively. The arms 14 and 15 are rigidly spaced apart vertically, the arm 15 serving primarily as a support while the arm 14 acts as a head. In the particular form of the invention illustrated the frame is a unitary structure in the nature of a C-frame, in which case it involves a vertically disposed back 16 extending between the rear end portions of the arms 14 and 15, as clearly shown in Fig. 1 of the drawings. In the form of construction illustrated the arms 14 and 15 and the back 16 of the frame B are a continuous elongate member tubular in cross sectional configuration and having the desired C-configuration.

The mounting means C mounts the frame B on the base A so that it is shiftable relative thereto. In the preferred arrangement the means C pivotally connects or mounts the frame on the base and in the arrangement illustrated the lower arm 15 of the frame is pivotally connected to the upper end portion of the standard 11 by a pivot pin 17. The pin 17 preferably extends horizontally between the upper end portion of the sides 13 of the standard 11 and extends through or carries the forward end portion of arm 15 as clearly shown throughout the drawings.

The actuating means D serves to shift or operate the frame B relative to the base A and where the frame is pivotally supported it serves to swing the frame about its pivotal axis. The means D is preferably a power means such as a fluid pressure means, in which case it may involve a fluid pressure actuated cylinder and piston mechanism or the like. In the case illustrated the means D is shown as including a cylinder 20 anchored at its lower end to the base A by a pivot pin 21 and a piston 22 operable in the cylinder 20 and having a piston rod 23 extending therefrom and projecting from the upper end of the cylinder to the frame B to which it is pivotally connected by a pivot pin 24. In the preferred arrangement, as shown in the drawings, the lower end of cylinder 20 is connected to the lower forward portion of the frame A while the upper end of the piston rod 23 is connected to the upper rear corner of the frame B, that is to the point of the frame where the arm 14 joins the back 16.

The cylinder 20 of means D is connected with a suitable pressure supply 25 through a control valve 26 preferably a treadle type valve located on the platform of the base A adjacent the standard 11. The construction may be such that when the operator depresses the pedal or operates the valve 26 fluid under pressure is admitted into cylinder 20, moving the piston 22 upwardly in the cylinder and causing the frame B to be operated to the position shown in Fig. 1 of the drawings. The structure is such that when the valve 26 is in the normal or unactuated position fluid is allowed to escape from cylinder 20, in which case gravity acting on the frame B causes it to swing or lower to the position shown in Fig. 2.

The stop means E is provided to limit pivotal movement of the frame B relative to the base A, preferably in both directions. In the form of the invention illustrated the stop means is shown as an independent means, that is, it is shown independent of the means D or of any other parts, except as will be hereinafter described. The stop means E in the form illustrated involves a rod 30 pivotally anchored to the base A, as by a pivot pin 31, and extending upwardly therefrom and through a guide 32 pivotally carried on the frame B. Stop collars 33 are adjustably set on the rod 30 and cushion springs 34 are provided to act between the guide and stop collars as the stop acts to limit the movement of the frame. It will be apparent from Fig. 1 of the drawings how by adjustment of the stops along the rod 30 the means E may be adjusted to stop the frame B in any desired rotative positions, as for example positions such as are shown in Figs. 1 and 2 of the drawings.

The work rest F is carried on or supported by the arm 15 of frame B, preferably at the forward end portion thereof. In the preferred form the rest is in the nature of a work carrying table and it may be such as to carry one or more parts or units of work, as circumstances may require. In the drawings the rest is shown as a flat plate-like element 35 elongate in form and such as to carry two work units W.

The mounting means G for the rest F supports the rest from the arm 15 of the frame so that it is shiftable relative thereto. It is preferred that the means G be such as to pivotally connect the rest and frame arm. In the case illustrated the means G is shown as involving a depending pivot pin 38 secured to the center of the rest F midway between its ends and depending into a bearing opening 39 provided in the forward end portion of the arm 15. The pin 38 rotatably fits the opening 39 and in practice the engagement is such as to allow the pin to be readily withdrawn from the opening whenever desired, so that a new or different rest can be engaged in the machine at will.

The work retaining means H cooperates with the rest F to hold units of work W thereon or in fixed position relative thereto. It is preferred that the means H be power actuated and it is most convenient that it be a fluid pressure actuated means. In the case illustrated the means H is shown as involving a cylinder 40 carried by the forward end portion of arm 14 of the frame B and a piston 41 operable in the cylinder and having a piston rod 42 projecting therefrom and carrying a clamp foot 43. In the preferred construction the clamp foot is pivotally carried by a pivot pin 44 supported by a head 45 on the outer or lower end of the piston rod 42. In the particular case illustrated a spring 46 is provided in the cylinder 40 below the piston 41 to normally yieldingly urge the piston upwardly in the cylinder so that the clamp foot 43 is normally in an up or elevated position as shown in Figs. 1 and 3 of the drawings. It is significant to note that the axis of the cylinder and piston mechanism of means H is coincidental with that of the mounting means G, making it possible for the operator to rotate the rest F freely in either direction while the means H is operated or engaged with work on the rest, as will be hereinafter described.

Operating pressure is applied to the cylinder 40 above the piston 41 from the pressure supply line 25 through a valve 48 preferably a treadle type valve, and a suitable line or pressure connection 49 extending from the valve 48 to the upper end of the cylinder 40. The valve 48 is preferably located on the platform 10 of the base A adjacent valve 26, so that it is convenient to the foot of the operator. The line 49 extends from the valve 48 upwardly through the standard 11 of the base and then through the frame to the cylinder 40 at the upper forward portion of the frame arm 14. It is to be understood that the connection 49 may be provided with a suitable flexible section 50 where the frame connects with the base, in order to allow for free movement of the frame relative to the base.

The particular object or work unit W to be handled by the form of the invention shown in the drawings is a digger tooth, or a cap applicable to a digger tooth, or the like. The cap is formed of two elements, a main part or blade 60 and a shell or cap 61. The blade 60 is a flat elongate part sharpened at one end to present a leading edge 62, and the particular unit illustrated in the drawings is provided at the other end with a projecting tongue 63. The shell or cap 61 is mounted on the top of the blade 60 and has a top 64 with its forward edge engaging the top of the blade and has depending sides 65 with their lower edges engaging the top of the blade. This particular unit of work involves welding 66 between the edges of the sides 65 and the blade 60 and welding 67 between the forward edge of the top 64 and the top of blade 60. It will be apparent from Fig. 12 of the drawings that these welds extend at different angles or are angularly related to each other and require manipulation of the unit relative to the welder if the welder is to remain in one position in the course of making the welds.

In handling work units such as I have just referred to it is advantageous to provide the rest F at the middle thereof with a spacer J against which the inner ends 69 of the blades 60 may abut and which spacer has a recess 70 into which the tongues 63 may extend. With the blades 60 of two work units on the rest F engaging opposite sides of the spacer J the blades extend in opposite directions from the center of the rest. In the particular form of the invention under consideration guides 71 are provided on the rest to facilitate proper location of the caps 61 on the blades 60. Each guide is shown as including a central body 73 extending longitudinally of the rest to enter a cap 61 and shoes 74 are provided at the sides of the body and are normally yieldingly urged outwardly by springs 75. The two guides 71 may be formed as a unit or they may be joined together as shown in the drawings, and a single orienting pin 76 may be carried by the rest to project upwardly from the center thereof and above the spacer J to enter a central opening 77 provided in the assembly formed by the two guides.

The means K serves to position the work parts, that is the blades and caps, in a lateral direction, and is in the nature of a fixture that is preferably carried by the frame B. The particular fixture or means K shown in the drawings involves a shiftable arm 90 carried by the frame B and supporting a head 91 which, when in operating position extends parallel with the rest F at one side or edge thereof, preferably at the inner side thereof. A plurality of orienting or locating pins 93 and 94 project from the head, the pins 93 engaging the rest 35 to hold it against movement, and the pins 94 engaging the sides of the blades 60 and caps 61 to hold them in position laterally relative to the blades on which they rest. In the particular case illustrated the arm 90 is pivotally connected to the frame B by pivot pin 95, so that when the work parts have been oriented the fixture K can be swung out of the way or to an inoperative position, such as is shown in Fig. 2 of the drawings.

In operating the holder of the present invention the means D is initially operated to position the frame B as shown in Fig. 1, the means H being in the unactuated position in which case the clamp foot 43 is in an elevated position. With the proper attachments or parts on the rest 35, that is with parts such as the spacer J and guides 71 in place on the rest, the blades 60 of the work units are arranged on the rest in engagement with the spacer. The caps 61 of the work units are then arranged in place on the guides and the fixture K is operated or rotated as shown in Fig. 1 to properly position the caps laterally of the blades. The operator then actuates valve 48 energizing means H so that the clamp foot 43 is moved downwardly into clamping engagement with the caps 61, forcing them tight against the blades. In the particular case illustrated the lower ends of the depending parts of the foot 43 are sharpened or pointed so that they effectively hold the caps in the desired manner. It will be understood that the shape, form, or character of parts such as the clamp foot may vary in practice, depending upon the work to be held.

With the separate parts of the two work units thus set in the desired relationship in the holder, the operator or welder can proceed to make the desired welds in a most advantageous manner. For example, he may release valve 26 allowing gravity to move the frame to the position shown in Fig. 2, with the result that the weld 66 at one side of one work unit may be made while the parts at the weld are horizontally disposed and faced upwardly in the desired manner. When this weld 60 has been completed the rest F may be freely rotated through 90° and in the desired direction, bringing the work unit being operated upon in position so that the weld 67 thereof can be made with the parts at the weld horizontally disposed and faced upwardly in the desired manner. When this weld 64 has been completed the rest can be rotated in the desired direction through 90°, bringing the other side or the other point of weld 66 into position so that the said other weld 66 can be made horizontally and in a most advantageous manner. When the weld of one work unit has thus been completed in what amounts practically to a continuous operation, the welder may repeat the cycle or operation with reference to the other work unit, thus completing the welds of two work units with one setting of parts in the holder. With the welds completed the holder is operated back to the position shown in Fig. 1 and the means H is released, thus freeing the completed work units so that they can be readily freed from the rest and the parts thereon.

In the case of the structure shown in Fig. 13 of the drawings the work units W' are arranged on the rest F with the inner ends of the blades 60' directly engaging each other without a spacer between them. This arrangement of blades is possible since the blades 60' are without tongues 63 that might otherwise interfere. In this form of the invention the guides 71 as above described are not employed, although it is desired that the fixture K be used to position the parts laterally, as hereinabove described.

Having described only typical preferred forms and applications of my invention, I do not wish to be limited or restricted to the specific details herein set forth, but wish to reserve to myself any variations or modifications that may appear to those skilled in the art and fall within the scope of the following claims.

Having described my invention, I claim:

1. A work holding machine including, a stationary base, a C-shaped frame with spaced upper and lower arms, means pivotally connecting the outer end of the lower arm of the frame to the base on a horizontal axis extending transverse of the machine with the frame opening toward the front of the machine, an elongate power unit having one end pivotally anchored to the base and the other end pivotally connected to the frame at a point rearward of said horizontal axis and operable to rock the frame between an up position where the lower arm is substantially horizontal and a down position where the lower arm extends downwardly and rearwardly, stop means limiting pivotal movement of the frame, a work rest having a work receiving face opposing the upper arm of the frame, means pivotally mounting the rest on the forward end portion of said lower arm between the arms and on an axis substantially normal to the said horizontal axis, a work positioning element pivotally mounted on the frame and movable to a working position where it holds the rest against rotation in a predetermined position, a work retainer engageable with work located on the rest, and power means supporting the retainer on the upper arm to reciprocate relative to the rest and pivot about an axis coincidental with that of the rest, the work positioning element being movable to a retracted position where it is clear of the rest and is related to the retainer so the rest is free to rotate, the pivotal axis of the positioning element being located in a plane substantially coincidental with that of said face and being spaced a substantial distance from the pivotal axis of the rest.

2. A work holding machine including, a stationary base, a C-shaped frame with spaced upper and lower arms, means pivotally connecting the outer end of the lower arm of the frame to the base on a horizontal axis extending transverse of the machine with the frame opening toward the front of the machine, a fluid pressure actuated cylinder and piston mechanism pivotally connected to the base and to the frame and operable to rock the frame between an up position where the lower arm is substantially horizontal and a down position where the lower arm extends downwardly and rearwardly, stop means limiting pivotal movement of the frame, a work rest having a work receiving face opposing the upper arm of the frame, means pivotally mounting the rest on the forward end portion of said lower arm between the arms and on an axis substantially normal to the said horizontal axis, a work positioning element pivotally mounted on the frame and movable to a working position where it holds the rest against rotation in a predetermined position, a work retainer engageable with work located on the rest, and power means supporting the retainer on the upper arm to reciprocate relative to the rest and pivot about an axis coincidental with that of the rest, the work positioning element being movable to a retracted position where it is clear of the rest and is related to the retainer so the rest is free to rotate and having stops engaging the work rest and stops in predetermined positions relative to the first mentioned stops and engageable by work on the rest when the rest is held by said element, the pivotal axis of the positioning element being located in a plane substantially coincidental with that of said face and being spaced a substantial distance from the pivotal axis of the rest, the work retainer having a head extending transversely of the axis of the retainer and rest and having spaced work engaging elemnts projecting from the head and toward the rest.

ERNIE L. LAUNDER.

REFERENCES CITED

The following references are of record in the file of this patent:

UNITED STATES PATENTS

| Number | Name | Date |
| --- | --- | --- |
| 769,955 | Osswald | Sept. 13, 1904 |
| 1,580,924 | Shannon | Apr. 13, 1926 |
| 1,732,081 | Clement | Oct. 15, 1929 |
| 1,930,642 | Clark | Oct. 17, 1933 |
| 2,289,597 | Seat | July 14, 1942 |
| 2,304,493 | Bullock | Dec. 8, 1942 |
| 2,353,891 | Gruntorad | July 18, 1944 |
| 2,429,669 | Crawford | Oct. 28, 1947 |
| 2,451,733 | Hockwarder | Oct. 19, 1948 |